United States Patent [19]
Harrell

[11] 3,890,236
[45] June 17, 1975

[54] FILTER STRUCTURE

[75] Inventor: Gary W. Harrell, Bakersfield, Calif.

[73] Assignee: AG-Water, Inc., Shafter, Calif.

[22] Filed: Jan. 14, 1974

[21] Appl. No.: 433,083

[52] U.S. Cl. ............... 210/433; 210/442; 210/457; 210/484; 210/497
[51] Int. Cl. ............................................. B01d 29/14
[58] Field of Search ........... 210/411, 433, 442, 457, 210/483–485, 497

[56] References Cited
UNITED STATES PATENTS

| | | | |
|---|---|---|---|
| 3,224,590 | 12/1965 | Nord et al. | 210/442 X |
| 3,327,864 | 6/1967 | Ball et al. | 210/497 X |
| 3,353,678 | 11/1967 | Dragon | 210/433 X |
| 3,794,179 | 2/1974 | Doucet | 210/433 X |

Primary Examiner—Charles N. Hart
Assistant Examiner—Richard W. Burks
Attorney, Agent, or Firm—Edward D. O'Brian

[57] ABSTRACT

A filter structure as disclosed in which a tubular self-supporting foraminous element and a flexible self-supporting filter element are located within the interior of a housing by flanges extending into the interior of the housing and into the interiors of these tubular elements adjacent to the ends of these tubular elements. Elastomeric rings are located externally of these flanges against the tubular filter element so as to be held under compression by the foraminous element in order to secure the filter element in place. One of the flanges is located on a closure of the housing so as to permit assembly and disassembly of the structure.

7 Claims, 3 Drawing Figures

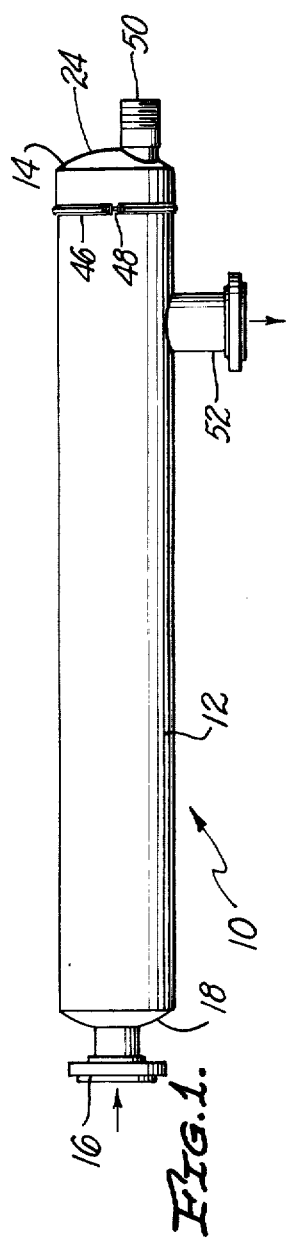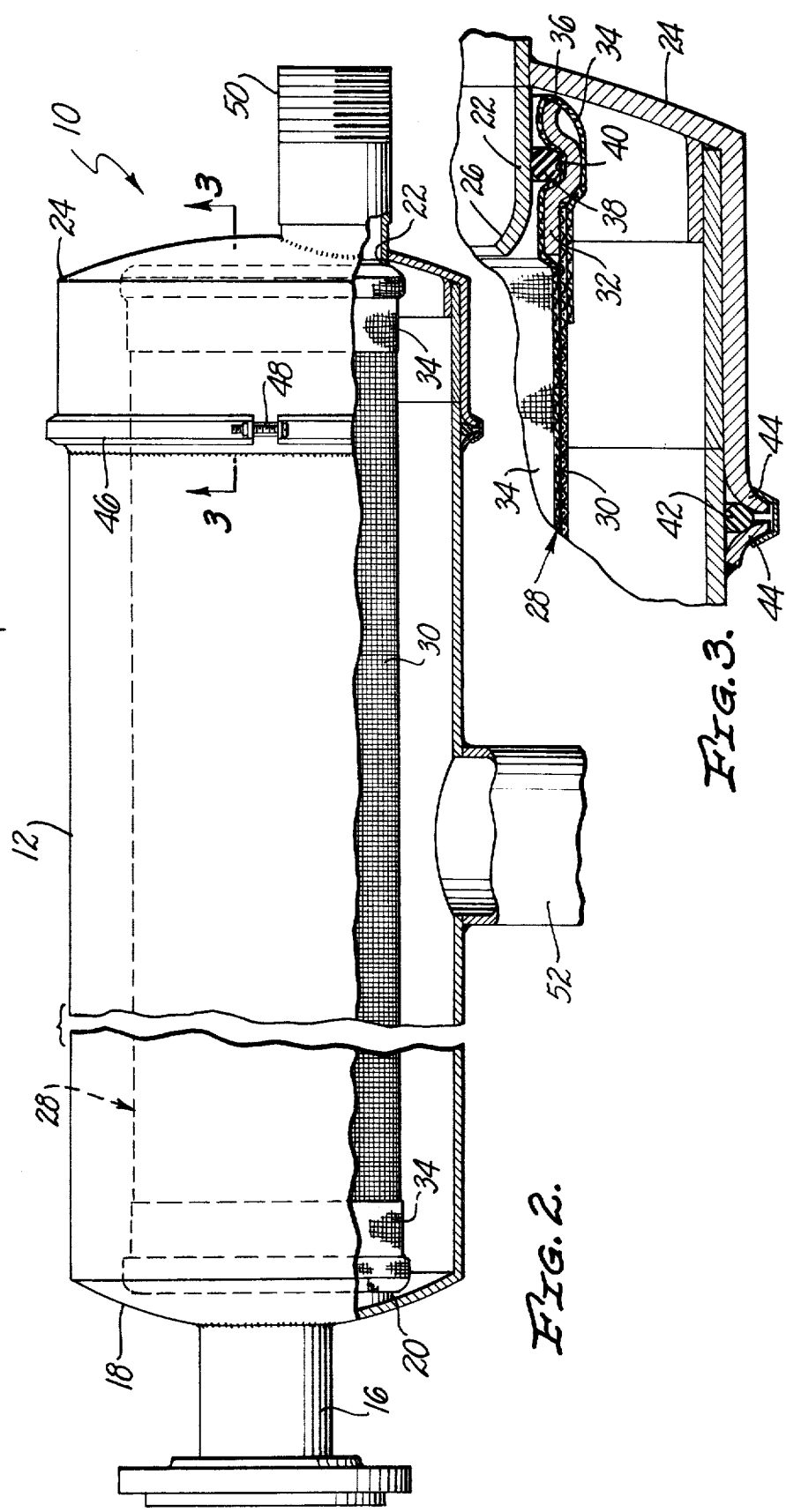

FILTER STRUCTURE

The invention set forth in this specification relates to new and improved filter structures. More specifically it relates to filter structures such as are on occasion referred to as barrel filters.

It will, of course, be recognized that there are a large number of different types of filters used in a wide variety of different applications. Frequently it is desired to utilize filters employing tubular filtering elements for reasons which are unimportant to an understanding of the present invention. Usually such structures are designed so that the actual filtering which occurs in them is performed by a tubular fabric element. Such elements can be constructed comparatively inexpensively. It is considered that they are particularly inexpensive when they are manufactured by circular knitting machines.

Such tubular fabric filtering elements are relatively difficult to mount in an operative position. In the past a wide variety of mounting structures have been used in connection with them. Some of such structures have been in the nature of ferrules and the like securing the ends of such elements in place. Some of such mounting structures have been in the nature of retainers tending to engage such elements along their lengths so as to hold them in position. In spite of the fact that a variety of such mounting structures have been developed and utilized in the past it is considered that there is a continuing need for a new and improved way of mounting a tubular fabric filtering element.

It is also considered that there is a continuing need for new and improved filters employing such elements which may be easily flushed or cleaned in use. Also it is considered that there is a need for filtering structures which can be manufactured at a comparatively nominal cost, which are capable of giving prolonged, reliable performance, and which can be easily and conveniently assembled and disassembled as needed.

SUMMARY OF THE INVENTION:

The invention set forth in this specification is intended to fulfill the various needs briefly indicated in the preceding discussion. The invention is intended to provide new and improved filter structures and more specifically filter structures which can be referred to as barrel type filters. The invention is directed to filter structures of this category which are constructed so as to utilize a flexible fabric tubular element. It is intended to provide filter structures of this type which may be easily and conveniently assembled and disassembled as required during their utilization. It is not to be implied, however, that these filter structures need frequent attention as they are used. The invention is intended to provide relatively inexpensive filter structures which are capable of giving prolonged, reliable performance.

In accordance with this invention these objectives are achieved in a filter structure having a housing provided with an inlet and outlet and having a filtering means separating the inlet and the outlet by the improvement which comprises: the housing having a closure located opposite the inlet, aligned tubular flanges located in the housing and on the closure, respectively, the flange mounted on the housing extending around the inlet, a self-supporting foraminous tubular member extending around and between both of the flanges, a flexible fabric tubular filter element extending through the foraminous member and around the ends of it, and resilient sealing rings under compression between the flanges and the filter element.

BRIEF DESCRIPTION OF THE DRAWINGS:

Unfortunately a summary such as the preceding is inherently incapable of indicating many aspects of an invention such as the invention indicated in this specification. Further details relative to this invention are best more fully indicated by referring to the remainder of this specification, the appended claims and the accompanying drawing in which:

FIG. 1 is a front elevational view of a presently preferred embodiment or form of a filter structure in accordance with this invention;

FIG. 2 is an enlarged side elevational view of this filter structure, this view being partially in section; and FIG. 3 is a partial cross-sectional view taken at line 3—3 of FIG. 2 of the drawing.

From a careful consideration of this specification and the drawing it will be apparent that the illustrated filter structure embodies or utilizes certain essentially intangible concepts as are verbally defined in the appended claims. These concepts may be utilized in a wide variety of differently constructed and differently appearing filter structures through the exercise of routine engineering skill.

DETAILED DESCRIPTION OF THE PREFERRED EMBODIMENT:

In the drawing there is shown a filter structure 10 of the present invention which utilizes an elongated cylindrical housing 12 one end of which is closed off by a closure 14. A conventional inlet 16 is located in the other end 18 so as to lead into the interior of a flange 20 which is axially aligned with the housing 12 and which extends into the interior of this housing 12. The flange 20 is secured to the end 18. A similar axially aligned flange 22 is located on the interior of an end 24 of the closure 14. These flanges 20 and 22 are preferably identically constructed so as to both terminate in inwardly directed, curved edges 26.

A tubular, self-supporting, foraminous member 28 is located within the housing 12 so as to extend between and around the flanges 20 and 22. This member 28 is preferably constructed so as to include a central section 30 formed out of a self-supporting wire screen carried by end collars 32. It may, however, be constructed in other ways such as, for example, out of a perforated sheet of metal. Although the member 28 is capable of serving as a filter element in the filter structure 10 the actual filtering is performed by a flexible fabric tubular filtering element 34. Such a filtering element 34 may be constructed in a variety of ways out of a variety of materials of both natural and synthetic origin. It is considered that it is most advantageous from an economic standpoint to construct the element 34 out of a circular knit tubular fabric.

This element 34 extends along the interior of the member 28 and around the ends 36 of the collars 32 and then back over the exteriors of the collars 32. It is preferably held in place relative to each of the flanges 20 and 22 by elastomeric, sealing O-rings 38 located between it and these flanges 20 and 22. The O-rings 38 are constrained against expansion and are held under compression against the element 34 by the rigid character of the collars 32. In order to prevent the rings 38 from moving during assembly and disassembly of the structure 10 they are provided with internal grooves 40 extending outwardly from the flanges 20 and 22.

These grooves 40 also aid in maintaining a firm holding action serving to help secure the element 34 in place. The element 34 may also be further secured in place against movement by dimensioning the member 28 so that when the structure is fully assembled the portions of the element 34 going around the ends 36 of the collars 32 are held under compression by the member 28 against the ends 18 and 24. It is not, however, considered that it is necessary to hold the element 34 in place in this manner.

As the filter structure 10 is being assembled the closure 14 will, of course, be removed from the housing 12. The filter element 34 may be conveniently inserted through the member 28 and temporarily secured in place by having its ends folded back over the collars 32. The O-rings 38 may then be located in place within the grooves 40 and the assembly of the element 34 within and around the ends 36 of the member 28 may be inserted within the housing 12. The curved edges 26 will facilitate this insertion. Then the closure 14 may be located in an operating position in the same manner. When it is so located a conventional sealing ring 42 is positioned between the opposed flanges 44 on the housing 12 and on the closure 14. These flanges 44 are then drawn together through the use of a conventional closure band 46 by tightening a conventional fastener 48 on this band 46.

When the filter structure 10 is to be used the inlet 16 may be connected in a conventional manner so as to convey the liquid to be filtered into the interior of the housing 12. Unless a back-flush outlet 50 on the closure 14 is used it is preferred that the inlet 16 be connected in a conventional manner so as to serve as the back-flush outlet. When the outlet 50 is used in the structure 10 it will, of course, be normally closed off by a conventional valve or the like so that liquid cannot flow from the interior of the housing 12 out through it. Also when the filter structure 10 is to be used a conventional filtrate outlet 52 secured to the housing 12 is preferably also connected in a conventional manner for conveying the filtrate to a desired location and preferably for permitting the entire structure 10 to be cack-flushed.

As liquid to be filtered is conveyed to the interior of the structure 10 to the inlet 16 the filter element 34 will be pushed against the member 28 as it serves its expected function of filtering out solids. After a filter cake has been built up in this manner the structure 10 can be back-flushed by discontinuing the flow of fluid through the inlet 16 and by forcing liquid under pressure through the outlet 52 into the interior of the housing 12. As this occurs the pressure of the back-flushing liquid will operate on the element 34 tending to flex it and tending to bow it outwardly. This will tend to release any accumulated filter cake so that such solids may be flushed out either through the outlet 50 if it is employed or through the inlet 16 if it is connected up so as to serve as a back-flush outlet.

The filter structure 10 is considered to be a very desirable, effective structure for its intended purpose. This structure is comparatively easy to assemble and disassemble. With it replacement of the filter element 34 as may be required as a result of fabric wear or the like is comparatively simple. This structure 10 is also a rather compact unit for its intended purpose. The diameters of the member 28 and the element 34 should be chosen so that the normally anticipated filter cake buildup will not completely clog the center region of the housing 12 in such a manner as to preclude liquid from flowing from one end of the housing to the other. Similarly the exterior of the member 28 should be dimensioned relative to the housing 12 so as to be spaced from the interior of the housing 12 a sufficient distance to accomodate expected fluid flow.

We claim:

1. In a filter structure having a housing provided with an inlet and an outlet and having a filter means located so that liquid flows through said filter structure during the operation of said filter structure the improvement which comprises:

said housing being provided with a closure enabling said housing to be opened and closed, said closure being located opposite said inlet, a first tubular flange located on said housing so as to extend internally of said housing around said inlet, a second tubular flange of the same diameter as said first tubular flange located on said closure so as to extend internally of said closure, said second flange being aligned with said first flange, a self-supporting, foraminous tubular member located so as to extend through said housing, said foraminous member extending around both of said flanges, the exterior of said foraminous member being spaced from the interior of said housing, a flexible, fabric, tubular filter element located so as to extend along the interior of said foraminous member, said filter element having ends extending around the ends of said foraminous member and back along the exterior of said foraminous member, and elastomeric resilient sealing rings held under compression between said fabric filter element and each of said flanges, said sealing rings extending completely around said flanges and being constrained against expansion by the said foraminous member, said outlet being located in said housing exterioly of said first filter element.

2. A filter structure as claimed in claim 1 including:

a second discharge outlet located in said closure in communication with the interior of said second flange.

3. A filter structure as claimed in claim 1 wherein:

said foraminous member includes continuous grooves formed in the ends thereof extending outwardly from the interior of said foraminous member adjacent to the ends thereof, said grooves being located opposite said flanges, said elastomeric sealing rings being held under compression within said grooves and being restrained against movement by engagement with the interiors of said grooves.

4. A filter structure as claimed in claim 3 wherein:

said sealing rings are elastomeric O-rings.

5. A filter structure as claimed in claim 1 wherein:

both of said flanges terminate in an inwardly directed edge so as to facilitate assembly of said filter structure.

6. A filter structure as claimed in claim 1 wherein:

said foraminous member is dimensioned so that said filter element is held under compression by engagement with the interior of said housing and with the interior of said closure by said foraminous member.

7. A filter structure as claimed in claim 1 including:
a second discharge outlet located in said closure in communication with the interior of said second flange, and wherein,
said foraminous member includes continuous grooves formed in the ends thereof extending outwardly from the interior of said foraminous member adjacent to the ends thereof, said grooves being located opposite said flanges,
said elastomeric sealing rings being held under compression within said grooves and being restrained against movement by engagement with the interiors of said grooves,
said sealing rings are elastomeric O-rings,
both of said flanges terminate in an inwardly directed edge so as to facilitate assembly of said filter structure,
said foraminous member is dimensioned so that said filter element is held under compression by engagement with the interior of said housing and with the interior of said closure by said foraminous member.

* * * * *